Figure 1:
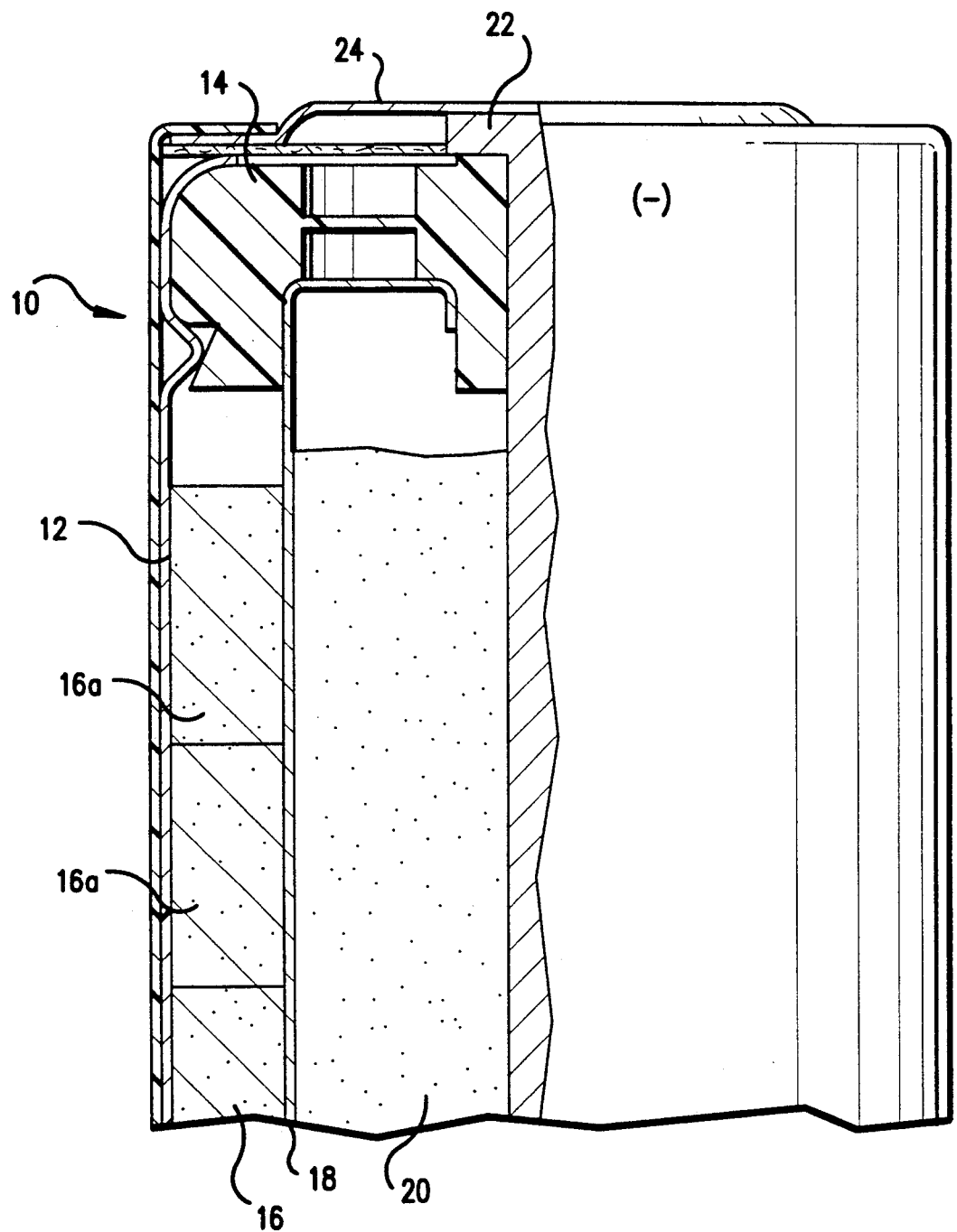

United States Patent [19]
Newman et al.

[11] Patent Number: 5,283,139
[45] Date of Patent: Feb. 1, 1994

[54] ALKALINE CELL

[75] Inventors: Gerald H. Newman, Weymouth, Mass.; G. Stephen Kelsey, Nashua, N.H.; Douglas C. Magnuson, Westboro, Mass.; Bhupendra K. Patel, Mansfield, Mass.; Douglas J. Woodnorth, Needham, Mass.; John S. Miller, Sudbury, Mass.; Alfred M. Kasianowicz, Pembroke, Mass.

[73] Assignee: Duracell Inc., Bethel, Conn.

[21] Appl. No.: 46,430

[22] Filed: Apr. 12, 1993

[51] Int. Cl.$^5$ .............................. H01M 4/24
[52] U.S. Cl. .................................. 429/224; 429/229
[58] Field of Search ............... 429/164, 224, 229, 232

[56] References Cited

U.S. PATENT DOCUMENTS

| | | | |
|---|---|---|---|
| 5,017,445 | 5/1991 | Ashihdra et al. | 429/232 X |
| 5,043,234 | 8/1991 | Tomantscnger et al. | 429/229 X |
| 5,139,900 | 8/1992 | Tada et al. | 429/229 X |
| 5,164,274 | 11/1992 | Kordesch et al. | 429/224 X |

*Primary Examiner*—Stephen Kalafut
*Attorney, Agent, or Firm*—Ronald S. Cornell; James B. McVeigh; Barry D. Josephs

[57] ABSTRACT

The present invention is an improved alkaline cell wherein the capacity of each of the anode and cathode is at least 0.48 and more preferably to at least 0.5 ampere-hour per cm$^3$ of internal cell volume. This is achieved by employing zinc densities of at least 1.4 grams of zinc per cm$^3$ of anode volume and MnO$_2$ densities of at least 2.7 grams of MnO$_2$ per cm$^3$ of cathode volume.

15 Claims, 1 Drawing Sheet

ALKALINE CELL

The present invention relates to an improved primary alkaline electrochemical cell having a zinc anode and a manganese dioxide cathode. More particularly, the invention concerns an optimized cell which provides up to a 10% increase in cell performance under the common discharge tests.

Alkaline cells having zinc anodes and manganese dioxide containing cathodes have been commercially available for over 20 years. Thus, the cells can be considered to be a mature product in that the performance characteristics of such cells, prior to the present invention, have been maximized by the competition among the major alkaline battery manufacturers to provide the "longest lasting" battery. All battery manufacturers have been operating under the same constraint in that the conventional battery sizes, i.e. AAA, AA, C, D and 9 V, have been standardized internationally. Thus, the volume within such cell sizes into which the active materials are packed is fixed. The amount of energy available from any given cell size has a theoretical upper limit which is defined by the internal cell volume and the practical densities of the cell's active components that are employed.

Each battery manufacturer, while being limited to the same internal volume into which the battery active materials can be packed, uses slightly different proportions in the amounts of active materials and electrolyte as compared to the other battery manufacturers. Thus, between the high and the low limits in the amount of zinc, manganese dioxide, graphite, zinc density, cathode density and electrolyte used by all of the battery manufacturers there is almost an infinite number of permutations possible. Applicants have discovered that it is possible to balance the zinc quantity, zinc density, $MnO_2$ quantity, $MnO_2$ density, and electrolyte quantity in such a way as to provide at least a 10% performance improvement over the best performing conventional alkaline batteries. This is a significant achievement, and quite unexpected, for a product whose performance has been optimized over a 20 year period by the competitive forces in the marketplace.

The discharge reaction at the zinc anode in an alkaline cell can be written as:

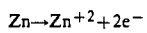
$$Zn \rightarrow Zn^{+2} + 2e^-$$

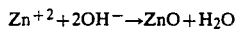
$$Zn^{+2} + 2OH^- \rightarrow ZnO + H_2O$$

The discharge reaction at the $MnO_2$ cathode can be written as:

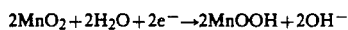
$$2MnO_2 + 2H_2O + 2e^- \rightarrow 2MnOOH + 2OH^-$$

The net cell reaction is given by the addition of these three reactions:

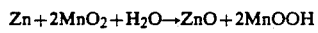
$$Zn + 2MnO_2 + H_2O \rightarrow ZnO + 2MnOOH$$

Thus, it can be seen that water is consumed by the reaction. One skilled in the art would expect that if the amount of active materials in a cell is increased the amount of KOH electrolyte must be proportionately increased s that enough water is present to keep the cell from drying out. If an alkaline cell becomes too dry due to water depletion the performance of the cell deteriorates. Applicants have discovered, however, that the amount of active materials can be increased without increasing the amount of aqueous KOH electrolyte over that used in conventional cells. In other words, the ratio of Zn/KOH (assuming a constant molarity of KOH electrolyte) can be increased over conventional ratios without affecting cell performance. This is discussed in greater detail below.

Conventional alkaline cells comprise a gelled zinc anode mixture. The mixture comprises individual zinc metal particles, a gelling agent, an amount of alkaline electrolyte, and minor amounts of other additives such as gassing inhibitors. A common gelling agent is a carboxymethycellulose type such as Carbopol 940. Non-limiting examples of gassing inhibitors include inorganic additives such as indium, bismuth, tin and lead and organic inhibitors such as phosphate esters such as RA600 (made by GAF) and anionic and non-ionic surfactants. See for example U.S. Pat. Nos. 5,168,018; 4,939,048; 4,500,614; 3,963,520; 4,963,447; 4,455,358; and 4,195,120 for examples of various anode mixtures known in the art.

Regardless of the particular anode mixture employed by a battery manufacturer the amount of zinc metal for a given cell size (as well as the other parameters discussed herein) falls within a specific range. For conventional AAA size cells it may range from 1.3 to 1.6 grams or 1.07 to 1.31 ampere-hours (based on 0.82 ampere-hour per gram). Similarly, the volumetric capacity of zinc anodes in AAA size cells (determined by dividing the capacity of zinc by the total internal volume of the sealed cell) may range from 0.385 to 0.492 ampere-hour per $cm^3$ of total internal cell volume. If zinc is the limiting electrode (versus the cathode) the foregoing values represent the maximum capacity and volumetric capacity available from the cell. Similarly, typical commercially available cells of other sizes are made within varying ranges of the other parameters discussed herein.

The present invention is based on the discovery that the capacity of each electrode can be increased to at least 0.48 and more preferably to at least 0.5 ampere-hour per $cm^3$ of internal cell volume without increasing the amount of electrolyte. This is achieved by employing zinc densities of at least 1.4 grams of zinc per $cm^3$ of anode volume and $MnO_2$ densities of at least 2.7 grams of $MnO_2$ per $cm^3$ of cathode volume.

The features and advantages of the present invention will now be described in reference to the figure in which:

FIG. 1 is a cross sectional view through an alkaline cell made in accordance with the present invention.

Cylindrical cell 10 comprises casing 12 closed at its open end by seal member 14 being crimped in place. Cathode 16 is an annular structure as shown wherein the outer surface of said cathode contacts the inner surface of the casing making electrical contact thereto. Cathode 16 is formed by stacking cathode pellets 16a as shown. Each cathode pellet is made from a mixture of $MnO_2$, a conductive agent, and electrolyte.

Cell 10 further comprises separator 18 which lines the inner surfaces of annular cathode 16. Separator 18 can be any of the well known separator materials such as cellulose or rayon.

Anode mixture 20 is located within the separator lined cavity. Anode mixture 20 as dispensed comprises zinc particles, alkaline electrolyte, a gelling agent, and one or more gassing inhibitors such as the ones described above. Generally, the zinc and alkaline electrolyte together comprise up to about 96%, and more preferably up to about 98% by weight of the mixture. The gelling agent comprises up to about 3%, and more preferably up to about 1% by weight of the mixture and the gassing inhibitors comprising up to about 1% by weight of the mixture.

Anode collector 22 passes through seal member 14 and into anode mixture 20 as shown. The upper end of anode collector 22 is connected to negative end cap 24 as shown, which end cap serves as the negative external terminal of cell 10. Additionally, an amount of alkaline electrolyte is added to the cell which becomes distributed throughout the anode, cathode, and separator.

The present invention is based on the discovery that less KOH electrolyte relative to the amount of zinc can be employed and still obtain efficient discharge (this is contrary to long held beliefs in the battery industry that the electrolyte amount could not be lowered if more active materials are used). As a result, the density of the zinc in the anode structure can be increased. Preferably, the weight ratio of zinc to KOH is at least 2.8:1, and more preferably at least 3:1. Such increased weight ratios of Zn/KOH results in a density of zinc in the anode volume of at least 1.4, more preferably at least 1.6, and most preferably at least 1.7 grams of zinc per $cm^3$ of anode volume. With more zinc added to the anode versus a conventional cell it is possible, regardless of cell size, to have the ratios of the capacity of the zinc anode to the internal volume of the cell at least as high as 0.48 ampere-hour per $cm^3$, and more preferably at least 0.5 ampere-hour per $cm^3$.

The improvement in discharge efficiency of the zinc anode resulting from a more dense anode led to the further discovery that the prior belief that the cathode inefficiency was the dominant factor in overall cell performance was incorrect. The amount of conductive agent provided in conventional alkaline cells (as much a 12% by weight in some cell sizes) as well as the density of $MnO_2$ in the cathode structure (on the order of 2.3 to 2.75 grams per $cm^3$ of cathode volume) was to help improve the cathode efficiency. Therefore, in accordance with the present invention less conductive agent is provided in the cathode whereby the amount of $MnO_2$ can be increased. Thus, the $MnO_2$ capacity can be kept in relative balance with the increased zinc capacity. Preferably, the ratio of the $MnO_2$ capacity to the zinc capacity is between 0.95:1 to 1.1:1, and more preferably is between 1:1 and 1.1:1. With more $MnO_2$ added to the cathode versus a conventional cell it is possible, regardless of cell size, to have the ratios of the capacity of the $MnO_2$ cathode to the internal volume of the cell at least as high as 0.48 ampere-hour per $cm^3$, and more preferably at least 0.5 ampere-hour per $cm^3$. The density of the $MnO_2$ is also higher than that conventionally used and is preferably at least 2.7, and more preferably at least 2.8 grams of $MnO_2$ per $cm^3$ of cathode volume.

Some battery manufacturers have employed a high density anode similar to the anode of the present invention, but they have not correspondingly also lowered the amount of electrolyte, lowered the amount of conductive agent in the cathode, and increased the amount of $MnO_2$. Thus, the specific combination of cell parameters encompassed by the appended claims have not previously been combined whereby the cell performance realized by the present invention greatly exceeds that which is obtainable by commercially available alkaline batteries.

The features and advantages of the present invention will now be demonstrated in the following examples.

EXAMPLE 1

This example demonstrates the improved performance of a AAA size cell made in accordance with the present invention as compared to a conventional AAA size cell.

A conventional AAA size alkaline cell has an internal volume of 2.84 $cm^3$. The zinc anode comprises 1.5 grams of zinc at a density of 1.24 grams per $cm^3$ of anode volume. The volumetric capacity of the zinc anode is 0.435 ampere-hour per $cm^3$ of internal cell volume. The $MnO_2$ cathode comprises 3.6 grams of $MnO_2$ at a density of 2.58 grams per $cm^3$ of cathode volume. The volumetric capacity of the $MnO_2$ cathode is 0.474 ampere-hour per $cm^3$ on internal cell volume. The electrolyte comprises 0.66 grams of KOH so that the weight ratio of zinc to KOH is 2.3:1.

A AAA alkaline cell made in accordance with the present invention has an internal volume of 2.84 $cm^3$. The zinc anode comprises 1.7 grams of zinc at a density of 1.74 grams per $cm^3$ of anode volume. The volumetric capacity of the zinc anode is 0.49 ampere-hour per $cm^3$ of internal cell volume. The $MnO_2$ cathode comprises 4.2 grams of $MnO_2$ at a density of 2.99 grams per $cm^3$ of cathode volume. The volumetric capacity of the $MnO_2$ cathode is 0.548 ampere-hour per $cm^3$ on internal cell volume. The electrolyte comprises 0.54 grams of KOH so that the weight ratio of zinc to KOH is 3.2:1.

Cells of each type are discharged under the following tests. A "radio" simulation test consists of discharging a cell across 75 ohms for 4 hours per day. The total number of hours to 0.9 volt is measured. A conventional AAA cell made as described above provides 64 hours of useful discharge whereas a AAA cell in accordance with the present invention, as describe above, provides 71 hours, a 11% improvement. A "photoflash" simulation test consists of discharging a cell across 3.6 ohms for 15 seconds every minute. The total number of hours to 0.9 volt is measured. A conventional AAA cell provides 6.12 hours of useful discharge whereas a AAA cell in accordance with the present invention provides 6.47 hours, a 6% improvement.

EXAMPLE 2

This example demonstrates the improved performance of a AA size cell made in accordance with the present invention as compared to a conventional AA size cell.

A conventional AA size alkaline cell has an internal volume of 6 $cm^3$. The zinc anode comprises 3.5 grams of zinc at a density of 1.4 grams per $cm^3$ of anode volume. The volumetric capacity of the zinc anode is 0.476 ampere-hour per $cm^3$ of internal cell volume. The $MnO_2$ cathode comprises 8.31 grams of $MnO_2$ at a density of 2.55 grams per $cm^3$ of cathode volume. The volumetric capacity of the $MnO_2$ cathode is 0.507 ampere-hour per $cm^3$ of internal cell volume. The electrolyte comprises 1.4 grams of KOH so that the weight ratio of zinc to KOH is 2.5:1.

A AA alkaline cell made in accordance with the present invention has an internal volume of 6 $cm^3$ The zinc anode comprises 3.9 grams of zinc at a density of 1.8 grams per $cm^3$ of anode volume. The volumetric capacity of the zinc anode is 0.533 ampere-hour per $cm^3$ of internal cell volume. The $MnO_2$ cathode comprises 9.3 grams of $MnO_2$ at a density of 2.9 grams per cm³ of cathode volume. The volumetric capacity of the MnO₂ cathode is 0.57 ampere-hour per cm³ on internal cell volume. The electrolyte comprises 1.25 grams of KOH so that the weight ratio of zinc to KOH is 3.1:1.

Cells of each type are discharged under the following test. A "photoflash" simulation test consists of discharging a cell across 1.8 ohms for 15 seconds every minute. The total number of hours to 0.9 volt is measured. A conventional AA cell provides 9.2 hours of useful discharge whereas a AA cell in accordance with the present invention provides 11.6 hours, a 26% improvement.

EXAMPLE 3

This example demonstrates the improved performance of a C size cell made in accordance with the present invention as compared to a conventional C size cell.

A conventional C size alkaline cell has an internal volume of 18.8 cm³. The zinc anode comprises 10.4 grams of zinc at a density of 1.4 grams per cm³ of anode volume. The volumetric capacity of the zinc anode is 0.45 ampere-hour per cm³ of internal cell volume. The MnO₂ cathode comprises 25 grams of MnO₂ at a density of 2.6 grams per cm³ of cathode volume. The volumetric capacity of the MnO₂ cathode is 0.49 ampere-hour per cm³ on internal cell volume. The electrolyte comprises 4.3 grams of KOH so that the weight ratio of zinc to KOH is 2.4:1.

A C size alkaline cell made in accordance with the present invention has an internal volume of 18.8 cm³. The zinc anode comprises 12 grams of zinc at a density of 1.6 grams per cm³ of anode volume. The volumetric capacity of the zinc anode is 0.53 ampere-hour per cm³ of internal cell volume. The MnO₂ cathode comprises 27 grams of MnO₂ at a density of 2.8 grams per cm³ of cathode volume. The volumetric capacity of the MnO₂ cathode is 0.53 ampere-hour per cm³ on internal cell volume. The electrolyte comprises 4.2 grams of KOH so that the weight ratio of zinc to KOH is 2.9:1.

Cells of each type are discharged under the following test. A "flashlight" simulation test consists of discharging a cell across 3.9 ohms for 4 minutes per hour for eight hours. The total number of hours to 0.9 volt is measured. A conventional C cell made as described above provides 18.5 hours of useful discharge whereas a C cell made in accordance with the present invention, as describe above, provides 20.7 hours, a 12% improvement.

EXAMPLE 4

This example demonstrates the improved performance of a D size cell made in accordance with the present invention as compared to a conventional D size cell.

A conventional D size alkaline cell has an internal volume of 41 cm³. The zinc anode comprises 23 grams of zinc at a density of 1.5 grams per cm³ of anode volume. The volumetric capacity of the zinc anode is 0.47 ampere-hour per cm³ of internal cell volume. The MnO₂ cathode comprises 53 grams of MnO₂ at a density of 2.6 grams per cm³ of cathode volume. The volumetric capacity of the MnO₂ cathode is 0.47 ampere-hour per cm³ on internal cell volume. The electrolyte comprises 9.7 grams of KOH so that the weight ratio of zinc to KOH is 2.4:1.

A D size alkaline cell made in accordance with the present invention has an internal volume of 41 cm³. The zinc anode comprises 25 grams of zinc at a density of 1.6 grams per cm³ of anode volume. The volumetric capacity of the zinc anode is 0.5 ampere-hour per cm³ of internal cell volume. The MnO₂ cathode comprises 57 grams of MnO₂ at a density of 2.8 grams per cm³ of cathode volume. The volumetric capacity of the MnO₂ cathode is 0.51 ampere-hour per cm³ on internal cell volume. The electrolyte comprises 8.9 grams of KOH so that the weight ratio of zinc to KOH is 2.9:1.

Cells of each type are discharged under the following test. A "flashlight" simulation test consists of discharging a cell across 3.2 ohms for 4 minutes per hour for eight hours. The total number of hours to 0.9 volt is measured. A conventional D cell made as described above provides 20.9 hours of useful discharge whereas a D cell in accordance with the present invention, as describe above, provides 22.3 hours, a 7% improvement.

While the previous examples set forth specific features of alkaline cells made in accordance with the present invention they are intended only as examples of the invention. Various changes ca be made to the cell construction and components and still remain within the spirit and scope of the invention as claimed. As used in the claims, any reference to the "zinc capacity" is based on 0.82 ampere-hour per gram of zinc and any reference to "MnO₂ capacity" is based upon 0.37 ampere-hour per gram of MnO₂.

What is claimed is:

1. A primary electrochemical cell having an anode comprising zinc, a cathode comprising manganese dioxide, and an alkaline electrolyte, all operatively associated within a cylindrical casing sealed at its open end by a seal member; wherein the inner surfaces of said seal member and casing define the internal volume of said cell; wherein the ratio of the total capacity of each of the anode and cathode to the internal volume of the cell each exceeds about 0.48 ampere-hour per cm³ of internal volume, and the density of zinc in the anode is at least 1.6 grams per cm³ of anode volume and the density of manganese dioxide is at least 2.8 grams per cm³ of cathode volume.

2. The primary alkaline cell of claim 1 wherein the electrolyte comprises potassium hydroxide (KOH) and the ratio of the amount of zinc to the amount of KOH is at least 2.8 grams of zinc per gram of KOH.

3. The primary alkaline cell of claim 1 wherein the electrolyte comprises potassium hydroxide (KOH) and the ratio of the amount of zinc to the amount of KOH is at least 3 grams of zinc per gram of KOH.

4. The primary alkaline cell of claim 1 wherein the ratio of the volumetric capacity of manganese dioxide to the volumetric capacity of zinc is between about 1:1 to 1.1:1.

5. The primary alkaline cell claim 1 wherein volumetric capacity of the zinc anode (based on 0.82 A-Hr/gram) and the volumetric capacity of the manganese dioxide (based on 0.37 A-Hr/gram) each exceeds about 0.50 ampere-hour per cm³ of internal volume and the density of zinc in the anode is at least 1.7 grams per cm³ of anode volume and the density of manganese dioxide is at least 2.9 grams per cm³ of cathode volume.

6. An electrochemical cell having an anode comprising zinc, a cathode comprising manganese dioxide, a separator between said anode and cathode, and an alkaline electrolyte comprising potassium hydroxide (KOH) all operatively associated within a cylindrical open-ended casing sealed at its open end by a seal member, wherein the inner surfaces of said seal member and casing define the internal volume of said cell; wherein said cathode is an annular structure having its outer wall contacting the inner wall of the casing, said separator lines the central cavity of the annular cathode, and said zinc anode resides within the separator lined cavity; wherein the internal volume of the cell is greater than 16 cm$^3$, the ratio of the total capacity of each of the anode and cathode to the internal volume of the cell each exceeds about 0.48 ampere-hour per cm$^3$ of internal volume, the density of zinc in the anode is at least 1.4 grams per cm$^3$ of anode volume, and the weight ratio of zinc to potassium hydroxide is at least 2.8:1.

7. The electrochemical cell of claim 6 wherein the density of manganese dioxide in the cathode structure is at least 2.8 grams of manganese dioxide per cm$^3$ of the cathode volume.

8. The electrochemical cell of claim 6 wherein the ratio of the volumetric capacity of manganese dioxide to the volumetric capacity of zinc is between about 1:1 to 1.1:1.

9. An electrochemical cell having an anode comprising zinc, a cathode comprising manganese dioxide, a separator between said anode and cathode, and an alkaline electrolyte comprising potassium hydroxide (KOH) all operatively associated within a cylindrical open-ended casing sealed at its open end by a seal member, wherein the inner surfaces of said seal member and casing define the internal volume of said cell; wherein said cathode is an annular structure having its outer wall contacting the inner wall of the casing, said separator lines the central cavity of the annular cathode and said zinc anode resides within the separator lined cavity; wherein the internal volume of the cell is less than 7 cm$^3$, the ratio of the total capacity of each of the anode and cathode to the internal volume of the cell each exceeds about 0.5 ampere-hour per cm$^3$ of internal volume, the density of zinc in the anode is at least 1.7 grams per cm$^3$ of anode volume, and the weight ratio of zinc to potassium hydroxide is at least 3.1:1.

10. The electrochemical cell of claim 9 wherein the density of manganese dioxide in the cathode structure is at least 2.8 grams of manganese dioxide per cm$^3$ of the cathode volume.

11. The electrochemical cell of claim 9 wherein the ratio of the volumetric capacity of manganese dioxide to the volumetric capacity of zinc is between about 1:1 to 1.1:1.

12. A "AA" size alkaline electrochemical cell comprising a cathode having in excess of 3 ampere hours of manganese dioxide (based on 0.370 ampere-hour per gram), an anode having in excess of 3 ampere hours of zinc (based on 0.82 ampere-hour per gram), and wherein the MnO$_2$ density in the cathode is in excess of 2.75 grams per cm$^3$ of cathode volume.

13. A "AAA" size alkaline electrochemical cell comprising a cathode having in excess of 1.3 ampere hours of manganese dioxide (based on 0.370 ampere-hour per gram), an anode having in excess of 1.3 ampere hours of zinc (based on 0.82 ampere-hour per gram), and wherein the MnO$_2$ density is in excess of 2.8 grams per cm$^3$ of cathode volume.

14. A "C" size alkaline electrochemical cell comprising a cathode having in excess of 8.5 ampere hours of manganese dioxide (based on 0.370 ampere-hour per gram), an anode having in excess of 8.5 ampere hours of zinc (based on 0.82 ampere-hour per gram), and wherein the MnO$_2$ density in the cathode is in excess of 2.7 grams per cm$^3$ of cathode volume.

15. A "D" size alkaline electrochemical cell comprising a cathode having in excess of 19 ampere hours of manganese dioxide (based on 0.370 ampere-hour per gram), an anode having in excess of 19 ampere hours of zinc (based on 0.82 ampere-hour per gram), and wherein the MnO$_2$ density in the cathode is in excess of 2.7 grams per cm$^3$ of cathode volume.

* * * * *